July 31, 1951
J. WILSON
2,562,226
AUTOMATIC BRAKE ADJUSTER
Filed Feb. 28, 1948
5 Sheets-Sheet 1
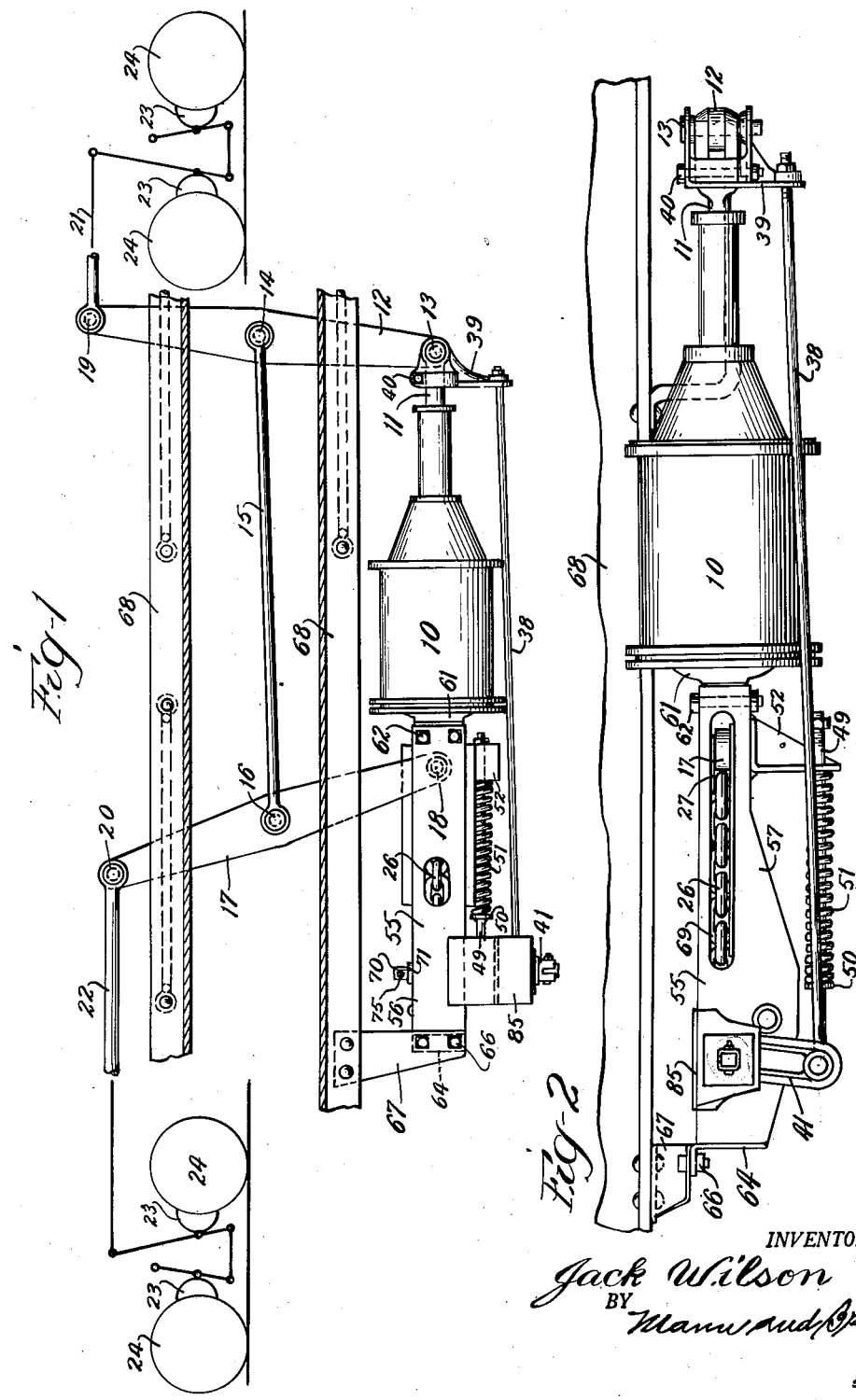
INVENTOR.
Jack Wilson
BY
Mann and Brown
Attys.

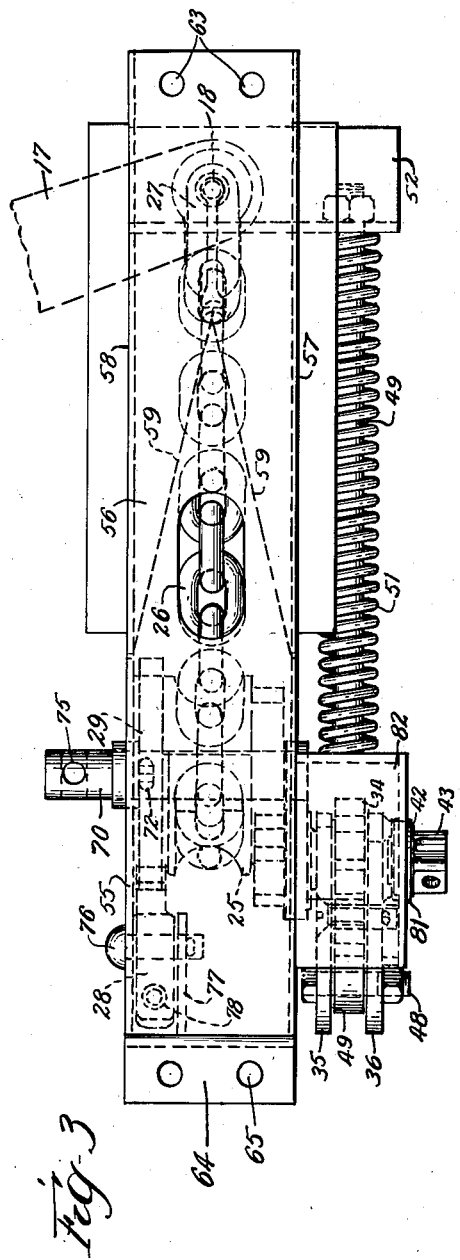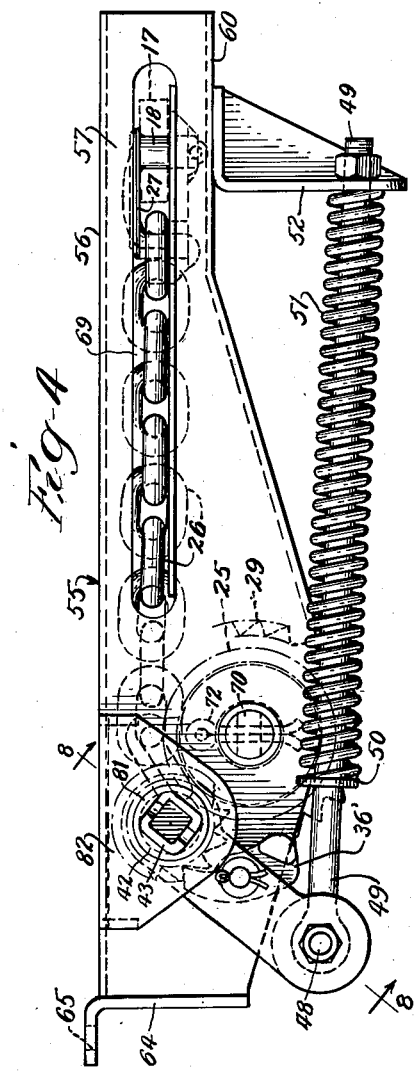

July 31, 1951  J. WILSON  2,562,226
AUTOMATIC BRAKE ADJUSTER
Filed Feb. 28, 1948  5 Sheets-Sheet 3
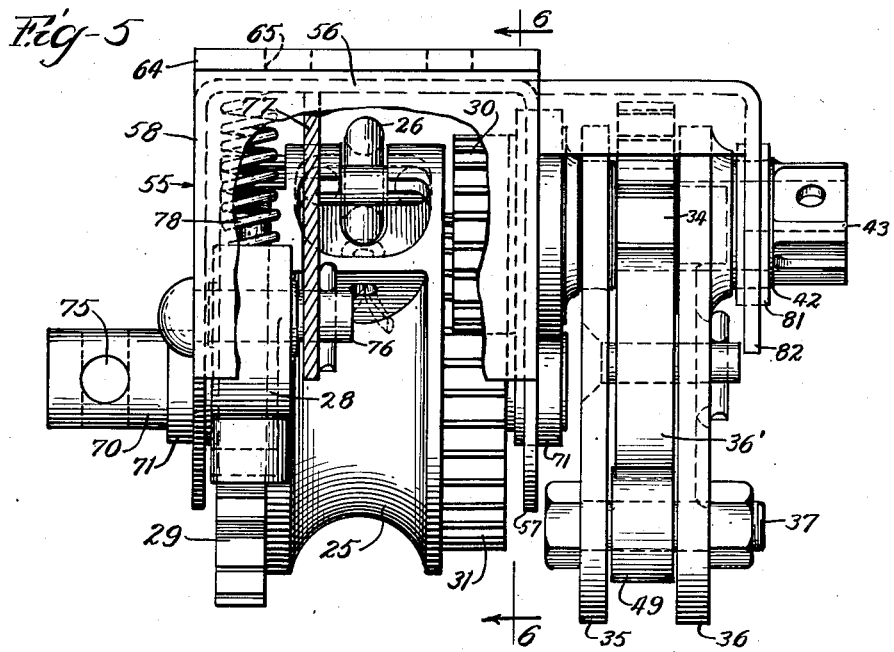
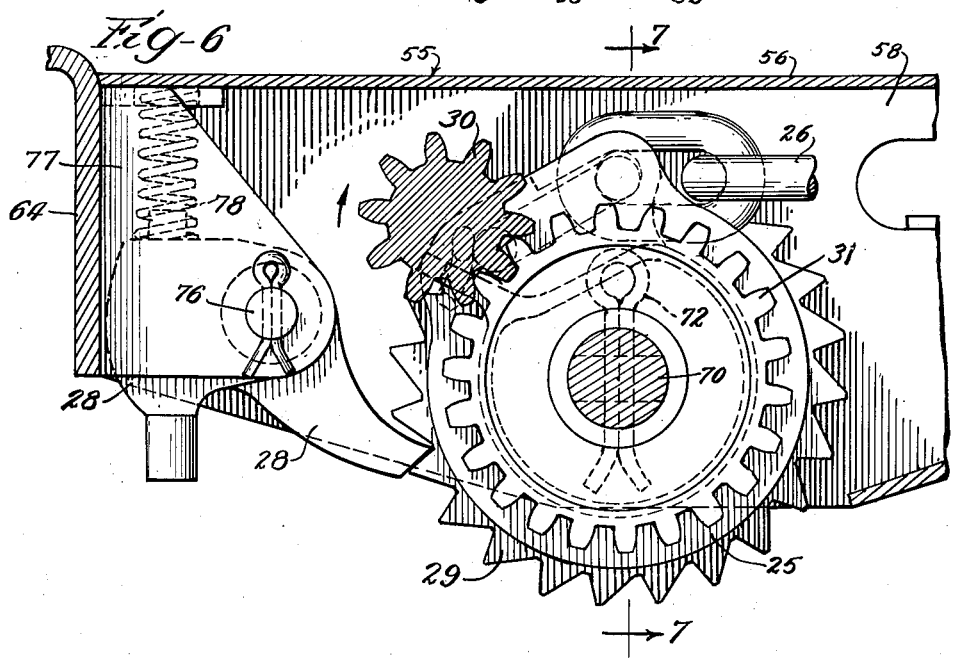
INVENTOR.
Jack Wilson July 31, 1951  J. WILSON  2,562,226
AUTOMATIC BRAKE ADJUSTER
Filed Feb. 28, 1948  5 Sheets-Sheet 4
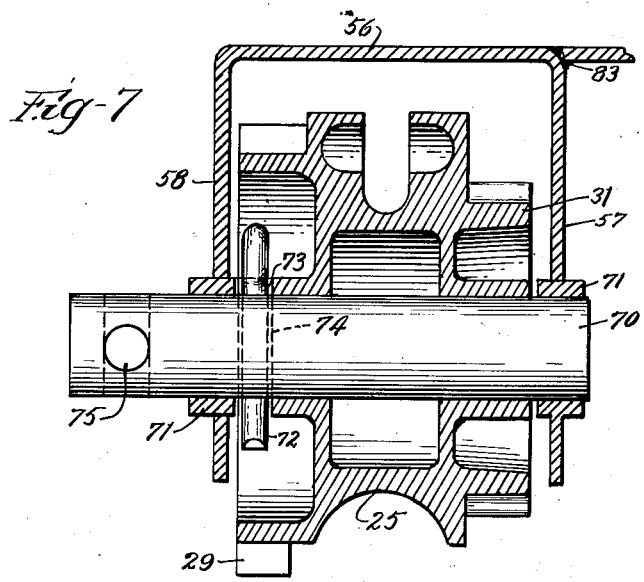
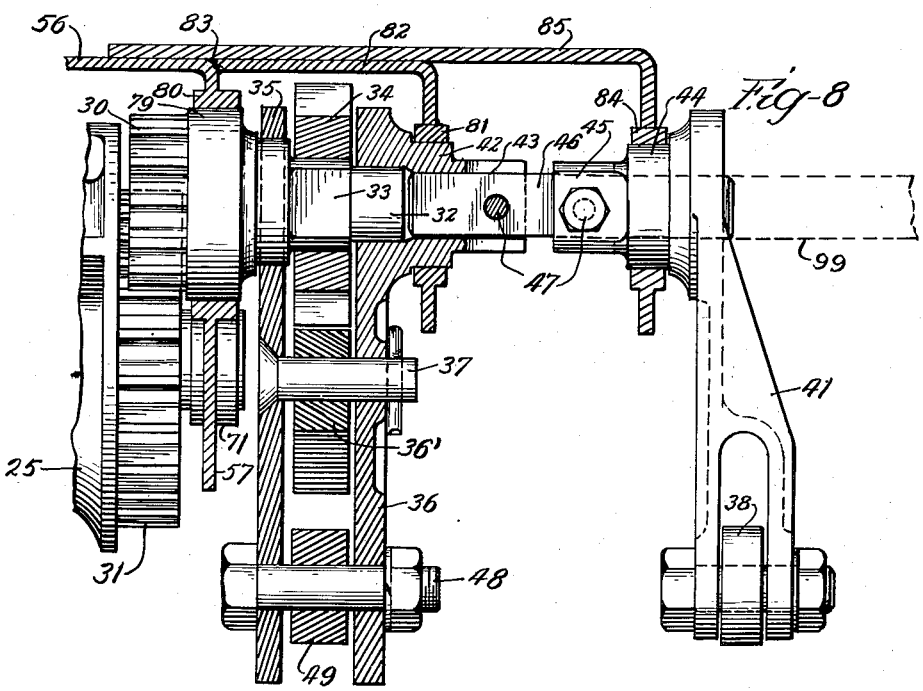
INVENTOR.
Jack Wilson
BY
Mann and Brown
Attys.

July 31, 1951  J. WILSON  2,562,226
AUTOMATIC BRAKE ADJUSTER
Filed Feb. 28, 1948  5 Sheets-Sheet 5
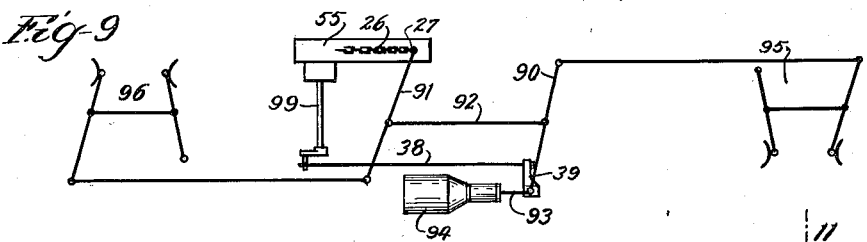
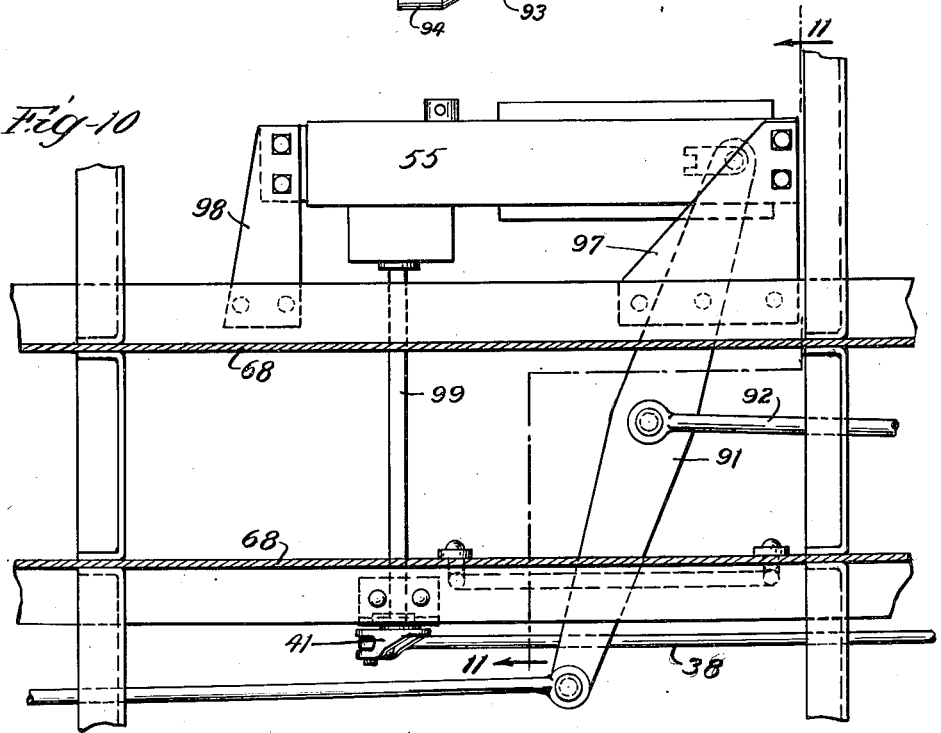
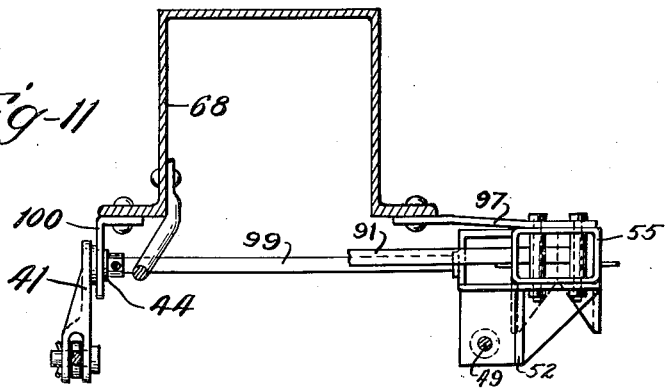
INVENTOR.
BY Jack Wilson
Mann and Brown
Attys.

Patented July 31, 1951

2,562,226

UNITED STATES PATENT OFFICE 2,562,226

AUTOMATIC BRAKE ADJUSTER

Jack Wilson, Chicago, Ill., assignor to Universal Railway Devices Co., a corporation of Delaware Application February 28, 1948, Serial No. 12,111

6 Claims. (Cl. 188—197)

1

This invention relates to brake adjusters for railway cars, and has for its principal object to provide a unit or article of manufacture that may be mounted on a car, connected with a selected lever of the particular foundation brake gear for adjusting it, and connected with another selected part of the foundation brake gear to be operated by it when a brake application includes movement in excess of a selected limit.

This application is a continuation in part of my application Ser. No. 705,529, filed October 25, 1946, now abandoned.

Fig. 1 is in part a diagrammatic representation of a foundation brake gear, and in part a horizontal section through the center sills of a car equipped with a brake adjuster embodying this invention;

Fig. 2 is a side elevation looking at the lower side of Fig. 1;

Fig. 3 is a plan view of the unit assembly or commercial article adapted to be used in connection with various foundation brake gear;

Fig. 4 is a side elevation of the same looking at the lower side of Fig. 3;

Fig. 5 is an end view looking at the left end of Fig. 3 with parts of the frame or casing broken away;

Fig. 6 is a vertical section taken on the line 6—6 of Fig. 5;

Fig. 7 is a transverse section taken on the line 7—7 of Fig. 6;

Fig. 8 is an inclined transverse section taken on the line 8—8 of Fig. 4;

Fig. 9 is a view similar to Fig. 1 showing another form of foundation brake gear in diagram and indicating the application of the brake adjuster made according to this invention;

Fig. 10 is a plan view of the brake adjuster and adjacent parts of the car frame and foundation brake gear; and Fig. 11 is a transverse section on the line 11—11 of Fig. 10.

In Fig. 1, 10 indicates an air brake cylinder having a push rod 11 connected to a live cylinder lever 12 by a pin 13. The live cylinder lever is connected by a pin 14 with one end of a rod 15, the other end of which is connected by a pin 16 with a dead cylinder lever 17 fulcrumed at 18. The upper ends of the levers 12 and 17 in Fig. 1 are connected by pins 19 and 20 with rods 21 and 22 leading to the familiar truck levers for applying the brake shoes 23 to the wheels 24 of the trucks.

When such a brake gear is properly adjusted, admission of air to the cylinder 10 moves the

2 push rod 11 to the right in Fig. 1, taking with it the pin 13 and the lower end of the lever 12. That lever fulcrums about the pin 14 while taking it to the right and draws the rod 15 to the right, which, in turn, rotates the dead cylinder lever 17 to the right. This movement brings the shoes against the wheels after a travel of the push rod 11, following which further movement of the push rod applies the braking pressure.

Wear on the shoes 23 and other things increases the necessary travel of the push rod 11 in order to apply the brakes. The purpose of this invention is to make a correction so as to restore the travel of the push rod 11 to the desired limit. This is accomplished by shifting the pin 18 or the fulcrum of the dead cylinder lever 17 to the left in Fig. 1 an amount corresponding to the excess travel, thereby restoring the normal condition of operation of the brake gear.

This adjustment is accomplished automatically as the slack in the gear occurs.

*The brake adjuster*

The adjustment is effected by a rotary take-up means, here illustrated as a sheave 25 (Figs. 3, 4, 5, and 6), upon which a chain 26 is adapted to be wound, one end of it being connected to the sheave 25 and the other end being connected to the fulcrum end of the dead cylinder lever 17 by a clevis 27. Use is made of a sheave and chain because of their acceptability in railway practice, but other equivalent mechanical movements are intended to be covered and will be availed of when preference so dictates.

The adjustment, once effected, is maintained by restraining the rotation of the sheave 25 in the direction to unwind the chain 26, and this is accomplished by means of a pawl 28 (Figs. 3 and 6) engaged with a ratchet 29, here shown as in one piece with the sheave 25.

The sheave 25 is rotated in a direction to adjust for slack, to the left in Fig. 6, by means of a pinion 30 (Figs. 5 and 8) meshing with a gear 31, here shown as integral with the sheave 25 and on the side opposite to the ratchet 29.

The pinion 30 is preferably (Fig. 8) made integral with or secured to a pinion shaft 32 having a polygonal section 33 upon which a ratchet 34 is mounted. The shaft 32 also has cylindrical bearings upon which a lever composed of an inner part 35 and an outer part 36 is rotatably mounted and fulcrumed. The lever is so made in order to straddle the ratchet 34 and carry between the two parts a pawl 36' pivoted to a pin 37 extending through the two parts of the lever, which pawl engages the ratchet 34 for driving it and in consequence the pinion 30 to the right in Fig. 6 to drive the gear 31 and hence rotate the sheave 25 in the direction to take up the slack.

The lever formed by the two parts 35 and 36 is given a rocking motion about the shaft 32 automatically during application of the brakes by air. This is accomplished by means of a connecting rod 38 (Fig. 2) having one end connected to an arm 39 made fast to the push rod 11 by the pin 13 and a bolt 40, and the other end connected to operating lever 41 (Figs. 2 and 8), which, in turn, operate the lever 35, 36.

Preferably, as here shown, the part 36 of that lever has a lateral projection 42 having a squared hollow section 43 corresponding to an oppositely directed projection 44 on the operating lever 41 having a corresponding squared hollow section 45, the two hollow sections receiving a length of squared shaft 46 made fast by bolts 47.

The ends of the lever 35, 36 opposite to the pinion shaft 32 are connected by a pin 48 with a spring rod 49 (Figs. 4 and 8) having a shoulder 50 and extending through a long helical spring 51 and through a bracket 52 serving as a stop against which the collar 50 may compress the spring 51.

When the push rod 11 moves to the right in Figs. 1 and 2, as heretofore described, it takes the rod 38 to the right and rocks the operating lever 41 to the right in Fig. 2, and that, in turn through the length of the shaft 43 rotates the lever 35, 36 to the right, pushing the spring rod 49 to the right and compressing the spring 51 against the bracket 52. Upon release of the brakes, the spring 51 reverses the movement of the lever 35, 36, taking the pawl 36' with it.

If the movement of the operating lever 41 during a brake application is of sufficient extent, it will advance the pawl 36' one tooth or more on the ratchet 34, and upon release of the brakes the spring 51 will drive the pawl 36' a corresponding amount, taking with it the pinion 30, the gear 31, and the sheave 25, thereby moving the fulcrum 18 of the dead cylinder lever 17 to the left in Fig. 1 and making a corresponding adjustment of the foundation brake gear.

It should be noted that the connecting rod 38 has a stop nut only on the outer face of the bracket 39, and this is so that some lost motion may be provided if desired in the connection with the piston rod. However, it is important that the lost motion should be substantially less than normal piston travel so that each time the brakes are applied, even when there is no excess slack in the gear, the rod 38 will be moved a substantial distance to rock the adjuster mechanism and to store energy in the spring 51 When a predetermined amount of excess slack appears in the gear, the rod 38 moves a sufficient distance to permit the pawl 36' to ride over a tooth of the ratchet wheel 34 with the result that upon release of the brake, the spring 51 actuates the adjuster to take up one tooth on the sheave ratchet 29. Due to the mechanical advantage derived from the arm 41, and due also to the other proportioning of the adjuster parts, the total amount of movement or adjustment of the brake lever fulcrum 18 during each actuation of the adjuster, and therefore the adjustment of the length of the piston stroke, is but a small part of the total travel of the rod 38 in effecting the adjustment. This relationship is important to the successful operation of the adjuster.

In the preferred form here shown, the brake adjuster is in the main assembled with a frame or casing indicated generally by 55 in Figs. 1, 9, and 10. That frame or casing is composed of a flat top 56, sides 57 and 58 extending downwardly to an open bottom. Toward the right in Fig. 3, the sides 57 and 58 are folded inwardly along the dotted lines 59 until their trimmed end portions are brought together along the center line of the frame, where they are welded together to form a short length of bottom indicated by 60 in Fig. 4.

Thus, the right end of the frame or casing 55 becomes box shaped or rectangular and of a size to fit over a projection 61 on some air cylinders 10 (Figs. 1 and 2), where it may be secured by bolts 62 passing through that projection and holes 63 in the top and bottom of the right end of the frame or casing.

At the left end of the frame or casing, an angular end piece 64 (Figs. 2, 3, 4, and 6) is welded, and the horizontal flange of it is provided with openings 65 to receive bolts 66 by which it may be secured to an arm 67 fixed to the car underframe, here represented by the center sills 68 (Figs. 1 and 2).

The sides 57 and 58 of the frame or casing are slotted at 69 to receive the dead cylinder lever 17 in Fig. 1, or any other lever to which the adjuster is to be secured, which lever may be in a variety of positions on the car according to the type of foundation brake gear.

The sheave 25 is carried by a shaft 70 (Figs. 3, 5, and 7) journalled in bushings 71 in the sides 57 and 58 of the frame or casing, and the sheave 25 and shaft 70 are secured together and made fast within the frame or casing by a cotter pin 72 inserted through notches 73 in the sheave and an opening 74 in the shaft 70.

One end of the shaft 70 projects beyond the side 58 and is provided with openings 75 to facilitate applying a crank or a bar to rotate the sheave 25 during assembly or during the operation of replacing shoes.

The pawl 28 is pivoted on a pin 76 extending through the side 58 and a plate 77 welded to the top 56 and the bracket 64. Pivotal movement of the pawl 28 toward engagement with the ratchet 29 is insured by the preponderance of weight at the left end in Fig. 6 augmented by a spring 78.

The pinion shaft 32 for the driving pinion 30 has a bearing portion 79 (Fig. 8) journalled in a bushing 80 in the side 57 of the frame or casing. The extension 42 on the lever portion 33 is journalled in a similar bushing 81 carried by an angle bracket 82 welded to the frame or casing at 83. The extension 44 on the operating arm 41 is journalled in a bushing 84 carried by an angle bracket 85 welded to the top 56 of the frame or casing and the bracket 82.

A consideration of the relation of parts shown in Fig. 8 will indicate the appropriate order of assembly of the lever portion 36, the ratchet 34, the lever portion 35, the pinion shaft 32, it being understood that this is done before the sheave 25 and shaft 70 are installed, as indicated in Fig. 7.

From the foregoing description, it will be apparent that the principal parts of the adjuster may be assembled in the frame or casing and handled as a unit in shipping and installing. The installation indicated in Figs. 1 and 2 will be apparent without further description.

As another example of foundation brake gear to which the adjuster is applicable, there is shown a foundation brake gear in Fig. 9 including levers 90 and 91 connected by a rod 92 and cooperating with a push rod 93 of an air cylinder 94 to apply brakes to the trucks indicated by 95 and 96. In this instance, the adjuster, indicated by the casing 55, is applied to the fulcrum of the lever 91 by connecting it to the chain 26 by a clevis 27. The frame or casing 55 will have been secured to brackets 97 and 98, as indicated in Fig. 10.

Because the fulcrum of the lever 91 is on the opposite side of the car from the push rod 92, the short length of shaft 46 (Fig. 8) used in the former installation is replaced by a long length of shaft 99 extending crosswise to the car and long enough to mount the operating lever 41 in line with the arm 39, which is reverse from the position shown in Fig. 1 and connected by a rod 38 to the lower end of the operating lever 41.

In this installation, the bracket 85 is omitted, and a bracket 100 (Fig. 11) provides a bearing corresponding to the bushing 84 for the projection 44 on the operating lever 41.

From the description of the other application, it will be apparent that the adjuster will be automatically operated by the push rod 93 upon application by air when there is sufficient slack in the gear.

The purpose of the automatic slack adjuster of this invention is to limit the total travel of the push rod to a pre-determined maximum by taking up slack in the foundation brake gear in small increments as required to maintain that limit.

The necessary power to operate the slack adjuster automatically comes from the push rod or the air in the cylinder, and hence must be relatively small so as to not unduly burden the source of power or reduce the power available for applying the brakes by air.

It is an important feature of this invention that the gearing, levers, and the spring 51 are so related to the work to be done and the power available that the drain upon the air braking system is within allowable limits.

To illustrate this, the critical data for certain parts in an embodiment that has been found satisfactory are here given. The gear 31 is 4.8" diameter at the pitch line. The driving pinion 30 is 2.4" at the pitch line. The levers 35, 36 and 41 are 6" on centers. The ratchet 34 is 3¾" outside diameter, 2¾" inside diameter at the base of the teeth, and there are 12 teeth 30 degrees on the centers. The spring 51 is made of spring steel .225" in diameter with 44 coils 1¼" inside diameter with a free height of 20¾" compressed 1¾" in an assembly under twenty pounds, and has a 10-inch travel with a total compression of about 150 pounds.

I claim:

1. An automatic brake adjuster for use with a foundation brake gear and a reciprocative brake adjuster having an initial range of operating movement to take up slack in the brake gear with little opposition by the brake gear and a final less extensive range of operating movement for placing the brake gear under increasing operating strain, said adjuster including rotary take-up means connected with said foundation brake gear, a rotary holding ratchet rotatable with said take-up means, a holding pawl to engage said holding ratchet to limit reverse rotation of the take-up means, a gear rotatable with the take-up means, a pinion in mesh with said gear, an actuating ratchet wheel operatively connected with said pinion, pawl means for advancing said ratchet wheel thereby to advance said take-up means, means to rock on the axis of said ratchet wheel, said rocking means being operatively connected with said pawl for actuation of the pawl, yielding means operatively connected with said rocking means to move the rocking means in the direction to advance said actuating ratchet wheel, said yielding means being connected to the rocking means at a distance from said axis substantially greater than the radius of said pinion, an actuator and means connected on one hand to said actuator and connected on the other hand to said rocking means at a point of substantially greater distance from said axis than the radius of said pinion, said adjuster parts being proportioned so that a substantial part of the energy required to effect an adjustment of said brake gear is stored in said yielding means during said initial range of operating movement of the brake gear.

2. An adjuster for the foundation brake gear of railway cars, which brake gear includes a dead brake lever having a fulcrum, said adjuster comprising a housing, a sheave journaled in said housing, a flexible connection between the sheave and said fulcrum of the dead brake lever for fixing the position of said brake lever fulcrum, means for restraining the sheave from rotation in a direction that tends to release the brakes, a relatively large gear on the sheave, a relatively small pinion gear in mesh with the sheave gear, a pinion shaft, a ratchet wheel on the pinion shaft for driving the pinion gear, a driving lever, a driving pawl carried by said driving lever and cooperating with the ratchet wheel for driving said ratchet wheel in one direction, an actuator connection between said driving lever and a moving part of the foundation brake gear for actuating said driving lever whenever the brakes are applied, spring means resiliently urging the driving lever in said one direction and having energy stored therein in response to normal movement of said foundation brake gear to brake setting position, said spring means having additional energy stored therein whenever the driving lever is moved to a position beyond that which it assumes for brake setting with normal brake shoe clearance, whereby only a part of the energy required to effect an adjustment of the gear is taken from the gear during excess travel of the gear, the parts of the adjuster being proportioned so that the total amount of movement for said brake lever fulcrum during any take-up movement of the sheave is less than the movement of said actuator connection in actuating the adjuster to effect such take-up movement.

3. An adjuster for the foundation brake gear of railway cars, which brake gear includes a dead brake lever having a fulcrum, said adjuster comprising a housing, a sheave journaled in said housing, a flexible connection between the sheave and said fulcrum of the dead brake lever for fixing the position of said brake lever fulcrum, means for restraining the sheave from rotation in a direction that tends to release the brakes, a relatively large gear on the sheave, a relatively small pinion gear in mesh with the sheave gear, a pinion shaft, a ratchet wheel on the pinion shaft for driving the pinion gear, a driving lever, a driving pawl carried by said driving lever and cooperating with the ratchet wheel for driving said ratchet wheel in one direction, an actuator connection between said driving lever and a moving part of the foundation brake gear for actuating said driving lever whenever the brakes are applied, spring means resiliently urging the driving lever in said one direction and having the greater part of the energy required to effect an adjustment of the brakes stored in the spring in response to normal movement of said foundation brake gear to brake setting position, said spring means having the remaining part of the energy required to effect an adjustment stored in said spring means whenever the driving lever is moved to a position beyond that which it assumes for brake setting with normal brake shoe clearance, whereby only a small part of the energy required to effect an adjustment of the gear is taken from the gear during excess travel of the gear, the parts of the adjuster being proportioned so that the total amount of movement for said brake lever fulcrum during any take-up movement of the sheave is less than the movement of said actuator connection in actuating the adjuster to effect such take-up movement.

4. An adjuster for the foundation brake gear of railway cars, which brake gear includes a dead brake lever having a fulcrum, said adjuster comprising a box housing adapted to be mounted on the car underframe and having side walls, one of which is slotted to receive and support said brake lever fulcrum, a sheave journaled between the side walls of said housing, a flexible connection between the sheave and the brake lever for fixing the position of said brake lever fulcrum, means for restraining the sheave from rotation in a direction that tends to release the brakes, a relatively large gear on the sheave, a relatively small pinion gear in mesh with the sheave gear, a pinion shaft journaled at least in part in one of said housing side walls above the axis of said sheave, a ratchet wheel on the pinion shaft for driving the pinion gear, a driving lever journaled for rotation about the axis of the pinion shaft and depending therefrom, a driving pawl carried by said driving lever and cooperating with the ratchet wheel for driving said ratchet wheel in one direction, connecting means for rocking said driving lever in the opposite direction in response to excessive brake gear movement, and spring means extending between the lower end of the driving lever and a point fixed with respect to the car underframe for rotating the driving lever in said one direction to effect an adjustment of said brake lever fulcrum, said adjuster having its parts proportioned so that the total amount of movement for said brake lever fulcrum when an adjustment is effected by said adjuster is less than the movement of said connecting means in actuating the adjuster to effect such adjustment.

5. In a brake adjuster, a frame adapted to receive a brake lever the fulcrum of which is to be adjusted, a sheave journaled crosswise to the frame and connected with said lever, means for restraining rotation of the sheave in one direction to maintain adjustment of the lever, means for rotating the sheave in the opposite direction including a gear on the sheave, a pinion for driving the gear, a pinion shaft, a ratchet on the pinion shaft, a lever carrying an actuating pawl for cooperation with the ratchet, said lever extending downwardly from and being fulcrumed on the pinion shaft, a spring between the lever and the frame, and a second lever operatively connected to and extending downwardly from the pinion shaft for rotating said pinion shaft to compress the spring, said adjuster having its parts proportioned so that the total distance that said brake lever fulcrum is moved when an adjustment is effected by the adjuster is substantially less than the total distance that said spring is compressed in order to effect an adjustment.

6. In a brake adjuster, a frame adapted to receive a brake lever the fulcrum of which is to be adjusted, a sheave journaled crosswise to the frame and connected with said lever, means for restraining rotation of the sheave in one direction to maintain adjustment of the lever, means for rotating the sheave in the opposite direction including a gear on the sheave, a pinion for driving the gear, a pinion shaft, a ratchet on the pinion shaft, a divided lever astride the ratchet and carrying an actuating pawl for cooperation with the ratchet, said lever extending downwardly from and being fulcrumed on the pinion shaft, a rod pivoted to said lever and movable lengthwise relative to the frame, and a spring on the rod acting between said frame and said lever, said rod and spring being below the axis of said sheave, said adjuster having its parts proportioned so that the total distance that said brake lever fulcrum is moved when an adjustment is effected by the adjuster is substantially less than the total distance that said spring is compressed in order to effect an adjustment.

JACK WILSON.

REFERENCES CITED

The following references are of record in the file of this patent:

UNITED STATES PATENTS

| Number | Name | Date |
| --- | --- | --- |
| 463,907 | Manchester et al. | Nov. 24, 1891 |
| 465,266 | Hinckley | Dec. 15, 1891 |
| 758,423 | Crowell | Apr. 26, 1904 |
| 1,111,640 | Brewster | Sept. 22, 1914 |
| 1,144,453 | Wood et al. | June 29, 1915 |
| 1,654,089 | Nilson | Dec. 27, 1927 |
| 2,433,139 | Martin | Dec. 23, 1947 |

FOREIGN PATENTS

| Number | Country | Date |
| --- | --- | --- |
| 23,524 | Great Britain | of 1908 |